United States Patent
Kim et al.

(10) Patent No.: US 9,445,434 B2
(45) Date of Patent: Sep. 13, 2016

(54) METHOD AND APPARATUS FOR TRANSCEIVING SIGNALS IN WIRELESS COMMUNICATION SYSTEMS

(71) Applicant: LG Electronics Inc., Seoul (KR)

(72) Inventors: Suhwook Kim, Gyeonggi-do (KR); Jinsam Kwak, Gyeonggi-do (KR); Wookbong Lee, Gyeonggi-do (KR); Seunghee Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 14/377,534

(22) PCT Filed: Feb. 8, 2013

(86) PCT No.: PCT/KR2013/001030
§ 371 (c)(1),
(2) Date: Aug. 8, 2014

(87) PCT Pub. No.: WO2013/119075
PCT Pub. Date: Aug. 15, 2013

(65) Prior Publication Data
US 2015/0003369 A1    Jan. 1, 2015

Related U.S. Application Data

(60) Provisional application No. 61/608,076, filed on Mar. 7, 2012, provisional application No. 61/597,170, filed on Feb. 10, 2012, provisional application No. 61/596,693, filed on Feb. 8, 2012.

(51) Int. Cl.
*H04W 74/08* (2009.01)
*H04W 16/14* (2009.01)

(52) U.S. Cl.
CPC ......... *H04W 74/0808* (2013.01); *H04W 16/14* (2013.01)

(58) Field of Classification Search
CPC ............. H04L 12/413; H04L 12/2856; H04L 12/2858; H04W 74/0808; H04W 74/0816; H04W 74/0825
See application file for complete search history.

(56) References Cited

U.S. PATENT DOCUMENTS 8,995,587 B1 * 3/2015 Zhang .................. H04B 7/0417
370/334
2004/0264475 A1 * 12/2004 Kowalski ............ H04L 12/5693
370/395.5

(Continued)

FOREIGN PATENT DOCUMENTS

KR    10-2010-0104017 A    9/2010
KR    10-2011-0030507 A    3/2011

(Continued)

OTHER PUBLICATIONS

International Search Report and Written Opinion issued in corresponding International Patent Application No. PCT/KR2013/001030 dated May 29, 2013.

*Primary Examiner* — Benjamin H Elliott, IV
(74) *Attorney, Agent, or Firm* — Morgan, Lewis & Bockius LLP

(57) ABSTRACT

One embodiment of the present invention relates to a method for transmitting a signal by a terminal in a wireless communication system which comprises a step wherein, during a predetermined time period in one portion of the frequency bandwidths from among the frequency bandwidths of channels used by said terminal, a carrier wave sensing signal of another terminal is transmitted in which information on the frequency bandwidths of the channel is included.

12 Claims, 16 Drawing Sheets

| Address | BSSID | Capability | Power constraint | Supported rate | Channel information | ... |
|---|---|---|---|---|---|---|

(56) References Cited

U.S. PATENT DOCUMENTS

| | | | |
|---|---|---|---|
| 2007/0042733 A1* | 2/2007 | Tomioka | H04W 48/18 455/179.1 |
| 2008/0311925 A1* | 12/2008 | Kogawa | H04W 72/10 455/452.1 |
| 2010/0081449 A1 | 4/2010 | Chaudhri et al. | |
| 2012/0208582 A1 | 8/2012 | Kang et al. | |
| 2012/0307782 A1* | 12/2012 | Kang | H04B 1/715 370/329 |
| 2015/0003369 A1* | 1/2015 | Kim | H04W 16/14 370/329 |

FOREIGN PATENT DOCUMENTS

| | | |
|---|---|---|
| KR | 10-2011-0033015 A | 3/2011 |
| KR | 10-2011-0054991 A | 5/2011 |
| KR | 10-2011-0060455 A | 6/2011 |

* cited by examiner

FIG. 15

| Address | BSSID | Capability | Power constraint | Supported rate | Channel information | ... |
|---------|-------|------------|------------------|----------------|---------------------|-----|

METHOD AND APPARATUS FOR TRANSCEIVING SIGNALS IN WIRELESS COMMUNICATION SYSTEMS

FIELD OF THE INVENTION

The following description relates to a method and apparatus for transceiving signals in wireless communication systems.

BACKGROUND ART

A standard for wireless local area network (WLAN) technology is being developed as an IEEE (Institute of Electrical and Electronics Engineers) 802.11 standard. IEEE 802.11a and b use an unlicensed band at 2.4. GHz or 5 GHz, and IEEE 802.11b provides a transmission rate (or transmission speed) of 11 Mbps, and IEEE 802.11a provides a transmission rate of 54 Mbps. IEEE 802.11g provides a transmission rate of 54 Mbps, by applying Orthogonal Frequency Division Multiplexing (OFDM) at 2.4 GHz. IEEE 802.11n provides a transmission rate of 300 Mbps with respect to 4 spatial streams, by applying Multiple Input Multiple Output-OFDM (MIMO-OFDM). And, IEEE 802.11n supports a channel bandwidth of up to 40 MHz, and, in this case, IEEE 802.11n provides a transmission rate of 600 Mbps.

A standard for regulating operations of an unlicensed device in a TV whitespace (TVWS) band corresponds to an IEEE 802.11af standard.

As a frequency being allocated to a broadcast TV, TVWS includes a UHF (Ultra High Frequency) band and a VHF (very high frequency) band, and the TVWS refers to a frequency band that is authorized to use unlicensed devices under the condition that the corresponding frequency band does not impede (or hinder) the communication of licensed devices operating in the corresponding frequency band. Licensed devices may include TVs, wireless microphones, and so on. A licensed device may also be referred to as an incumbent user or a primary user. Additionally, in order to resolve the problem of coexistence between unlicensed devices using the TVWS, a signaling protocol, such as a common beacon frame, a frequency sensing mechanism, and so on, may be required. Unlicensed devices operating in the TVWS may be classified as Fixed Devices, Personal/Portable Mode I devices, Personal/Portable Mode II devices, and so on. As a fixed-type user equipment, the Fixed Device is required to register its position in a geo-location database, and the Fixed Device may obtain an available channel list by accessing the geo-location database. The Fixed Device operates in the corresponding available channel list, and, if a channel that is being used by the corresponding Fixed Device is no longer available, the usage of the corresponding channel is suspended. As a personal portable user equipment, the Personal/Portable Mode II does not register its position in the geo-location database, however, the Personal/Portable Mode II may obtain an available channel list by accessing the geo-location database. The Personal/Portable Mode II device operates in the corresponding available channel list, and, if a channel that is being used by the corresponding Personal/Portable Mode II device is no longer available, the usage of the corresponding channel is suspended. As compared to the Fixed Device, a transmission output power is limited. The Personal/Portable Mode I device is controlled by the Fixed device and the Personal/Portable Mode II device. And, just as the Personal/Portable Mode II device, although the Personal/Portable Mode I device does not register its position in the geo-location database, the Personal/Portable Mode I device may carry out a validity verification process respective to its device ID through the geo-location database, so as to be authorized for usage. Additionally, the Personal/Portable Mode I device is required to obtain the available channel list from the Personal/Portable Mode II device, and the Personal/Portable Mode I device should periodically verify that the available channel list remains unchanged.

Although in 512~608 MHz and 614~698 MHz, the operation of all unlicensed devices is authorized with the exception for a few special cases, in bands of 54~60 MHz, 76~88 MHz, 174~216 MHz, and 470~512 MHz, only the communication between fixed devices performing signal transmission in pre-decided locations is authorized. An IEEE 802.11 TVWS user equipment (or terminal) refers to an unlicensed device that is operated by using media access control (MAC) and a physical layer (PHY).

Table 1 shown below shows a comparison between a performance of IEEE 802.11ac PHY and a performance of IEEE 802.11 of PHY. The IEEE 802.11 of PHY, which uses the IEEE 802.11ac PHY that is processed with ¹/₁₀ down-clocking, provides 2 MHz/4 MHz/8 MHz/16 MHz/8+8 MHz channel bandwidths. In case of performing ¹/₁₀ down-clocking, a Guard Interval (GI) increases from 0.8 us to 8 us.

TABLE 1

| IEEE 802.11ac PHY | | IEEE 802.11af PHY | |
| --- | --- | --- | --- |
| Channel bandwidth | Throughput | Channel bandwidth | Throughput |
| 20 | 86.7 | 2 | 8.67 |
| 40 | 200 | 4 | 20 |
| 80 | 433.3 | 8 | 43.33 |
| 160 | 866.7 | 16 | 86.67 |
| 80 + 80 | 866.6 | 8 + 8 | 86.66 |

DETAILED DESCRIPTION OF THE INVENTION

Technical Objects

The exemplary embodiment of the present invention relates to a method for transceiving signals and, more particularly, to a frame structure enabling carrier sensing of other user equipments to be performed easily.

The technical objects of the present invention will not be limited only to the objects described above. Accordingly, technical objects that have not been mentioned above or additional technical objects of the present application may become apparent to those having ordinary skill in the art from the description presented below.

Technical Solutions

According to a first technical aspect of the present invention, as a method of a user equipment for transmitting a signal in a wireless communication system, the method for transmitting a signal includes a step of transmitting a signal for carrier sensing other user equipments during a predetermined period of time in some frequency bands among multiple frequency bands of a channel used by the user equipment, wherein the signal for carrier sensing includes information on a frequency bandwidth of the corresponding channel.

According to a second technical aspect of the present invention, as a user equipment device transmitting a signal in a wireless communication system, the user equipment device includes a transceiver; and a processor configured to control the device including the transceiver, wherein the processor is configured to transmit a signal for carrier sensing other user equipments during a predetermined period of time in some frequency bands among multiple frequency bands of a channel used by the user equipment, and wherein the signal for carrier sensing includes information on a frequency bandwidth of the corresponding channel.

The first and second technical aspects of the present invention may include all or some of the following details.

The signal for carrier sensing may be transmitted before the user equipment transmits a signal from a frequency bandwidth of the corresponding channel.

Said some frequency bands may correspond to a frequency band wherein multiple channels each having a different bandwidth overlap one another.

Signal transmission may not be carried out during a predetermined period of time in remaining frequency bands excluding said some frequency bands.

The signal for carrier sensing may include an N-STF (Narrowband Short Training Field), an N-LTF (Narrowband Long Training Field), and an N-SIG (Narrowband Signal).

Information indicating a position in which a frequency bandwidth of the corresponding channel is located within the overall frequency bands of the wireless communication system may be included in a beacon frame.

According to a third technical aspect of the present invention, as a method of a user equipment for receiving a signal in a wireless communication system, the method for receiving a signal includes a step of receiving a signal for carrier sensing during a predetermined period of time in some frequency bands set up in the wireless communication system, wherein the signal for carrier sensing includes information on a frequency bandwidth of the corresponding channel.

According to a fourth technical aspect of the present invention, as a user equipment device receiving a signal in a wireless communication system, the user equipment device includes a transceiver; and a processor configured to control the device including the transceiver, wherein the processor is configured to receive a signal for carrier sensing during a predetermined period of time in some frequency bands set up in the wireless communication system, and wherein the signal for carrier sensing includes information on a frequency bandwidth of the corresponding channel.

The third and fourth technical aspects of the present invention may include all or some of the following details.

The signal for carrier sensing may be transmitted before a signal is transmitted from a frequency bandwidth of the corresponding channel.

Said some frequency bands may correspond to a frequency band wherein multiple channels including the corresponding channel each having a different bandwidth overlap one another, the different bandwidths being set up in the wireless communication system.

Signal transmission may not be carried out during a predetermined period of time in remaining frequency bands excluding said some frequency bands.

The signal for carrier sensing may include an N-STF (Narrowband Short Training Field), an N-LTF (Narrowband Long Training Field), and an N-SIG (Narrowband Signal).

Information indicating a position in which a frequency bandwidth of the corresponding channel is located within the overall frequency bands of the wireless communication system may be received from a beacon frame.

Effects of the Invention

According to the exemplary embodiment of the present invention, the user equipment may perform carrier sensing on channels respective to different frequency bands while minimizing processing load.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application.

BRIEF DESCRIPTION OF THE DRAWINGS

The accompanying drawings, which are given to provide a further understanding of the present invention, illustrate diverse exemplary embodiments of the present invention and describe the principles of the present invention along with the detailed description.

FIG. 15 illustrates a beacon frame according to an exemplary embodiment of the present invention.

MODE FOR CARRYING OUT THE PRESENT INVENTION

Figure 1:
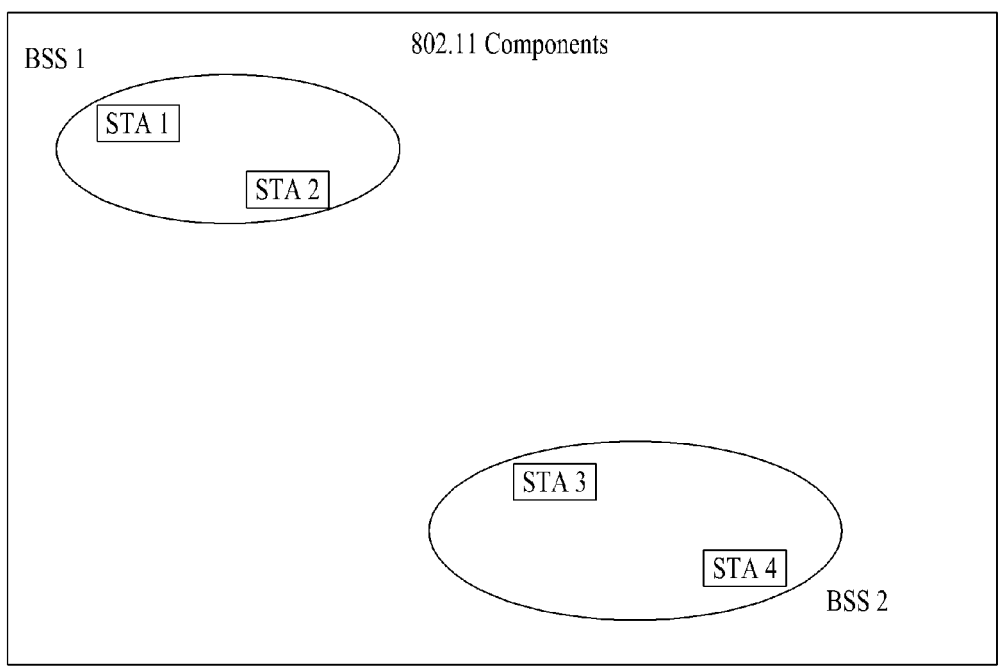
FIG. 1 illustrates an exemplary structure of a wireless LAN system.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein.

Meanwhile, in some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Additionally, within the overall specification the same reference numerals will be used for referring to and describing the same elements.

First of all, a general structure of a wireless LAN system will hereinafter be described in detail with reference to FIG. 1 and FIG. 2.

FIG. 1 illustrates an exemplary structure of a wireless LAN system.

As shown in FIG. 1, the wireless LAN system includes one or more Basic Service Sets (BSSs). A BSS corresponds to a group of Stations (STAs) successfully establishing synchronization between one another, thereby being capable of communicating with one another.

As a logical entity including Medium Access Control (MAC) and a Physical Layer interface respective to a wireless medium, the STA includes an access point (AP) and a Non-AP STA (Non-AP Station). Among the STAs, a mobile user equipments being manipulated by the user corresponds to a Non-AP STA, and, when simply referred to as an STA, the STA may also indicate a Non-AP STA. The Non-AP STA may also be referred to as other terms, such as a terminal, a Wireless Transmit/Receive Unit (WTRU), a User Equipment (UE), a Mobile Station (MS), a Mobile Terminal, a Mobile Subscriber Unit, and so on.

Additionally, the AP corresponds to a functional entity providing access to a Distribution System (DS) to an STA (Associated Station), which is coupled to the corresponding AP, by passing through a wireless medium. The AP may also be referred to as Base Station (BS), Node-B, BTS (Base Transceiver System), or site controller, and so on.

The BSS may be divided into an infrastructure BSS and an Independent BSS (IBSS).

The BSS shown in FIG. 1 corresponds to an IBSS. The IBSS refers to a BSS that does not include any APs, and, since the IBSS does not include any APs, access of the IBSS to the DS is not authorized, and, therefore, the IBSS realizes a self-contained network.

Figure 2:
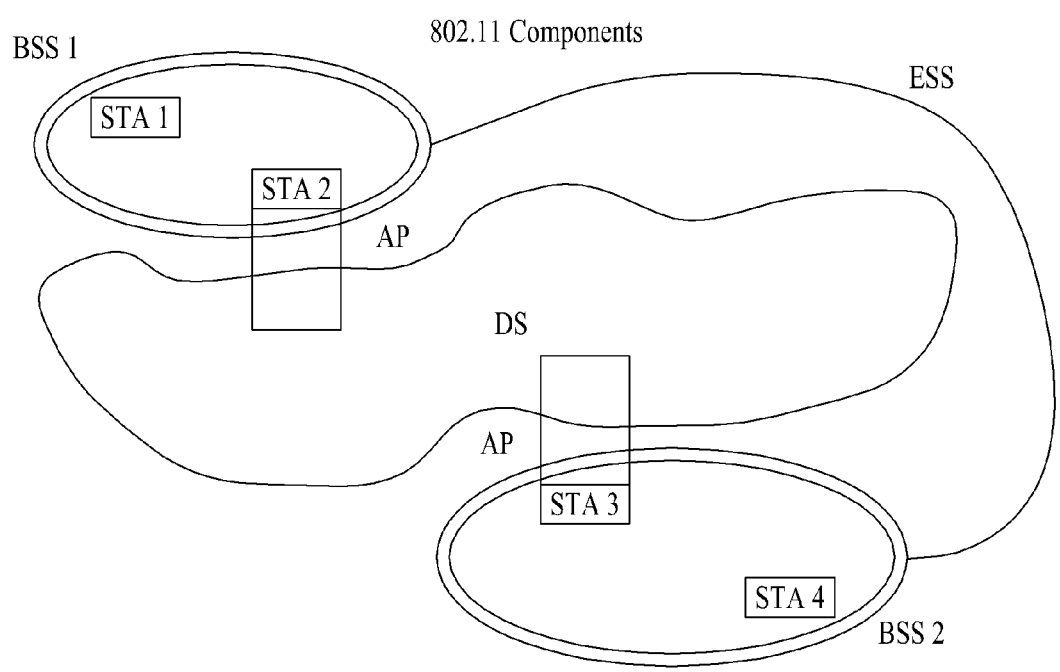
FIG. 2 illustrates another exemplary structure of a wireless LAN system.

FIG. 2 illustrates another exemplary structure of a wireless LAN system.

The BSS shown in FIG. 2 corresponds to an infrastructure BSS. The infrastructure BSS includes one or more STAs and APs. As a rule, in the infrastructure BSS, communication between non-AP STAs is realized by passing through an AP. However, if a direct link is set up between the non-AP STAs, the non-AP STAs may be capable of performing direct communication between one another.

As shown in FIG. 2, multiple infrastructure BSSs may be connected to one another through a DS. The multiple BSSs that are connected to one another through the DS are collectively referred to as an Extended Service Set (ESS). The STAs being included in the ESS may communicate with one another, and a non-AP STA may perform uninterrupted communication within the same ESS and may shift from one BSS to another BSS.

As a mechanism connecting multiple APs, the DS is not necessarily required to be a network, and, as long as a predetermined distribution service can be provided, the format of the DS will not be limited. For example, the DS may correspond to a wireless network, such as a mesh network, or the DS may also correspond to a physical architecture (or structure) connecting the APs to one another.

A spectrum that is not used by a licensed device (or an incumbent user) is referred to as a white space, and, herein, the white space may be used by unlicensed devices. In order to allow an STA to be operated in a white space spectrum, a protection (or guard) scheme for the incumbent user is required to be provided firsthand. In order to allow an STA or AP to protect the incumbent user, only the channels that are not used by the incumbent user should be used. A channel that is not used by the incumbent user(s), thereby being available for usage by the unlicensed devices, is referred to as an available channel. One of the most basic methods for allowing an STA or AP to determine the availability of a TV channel corresponds to a method of performing spectrum sensing and acquiring a TV channel schedule by accessing a Database (DB). Information of the DB includes information, such as usage schedule of a specific channel by an incumbent user (or licensed device) at a specific position. Therefore, when an STA or AP wishes to determine the availability or non-availability of a TV channel, the STA or AP is required to acquire DB information based upon its position information, by accessing the DB through the internet.

In order to access the network, the STA is required to locate (or find) a network that is available to participate in the communication. Before participating in a wireless network, the STA should identify a network that is backward compatible, and, herein, a process of identifying a network existing in a specific area is referred to as scanning. The scanning process includes active scanning and passive scanning.

Figure 3:
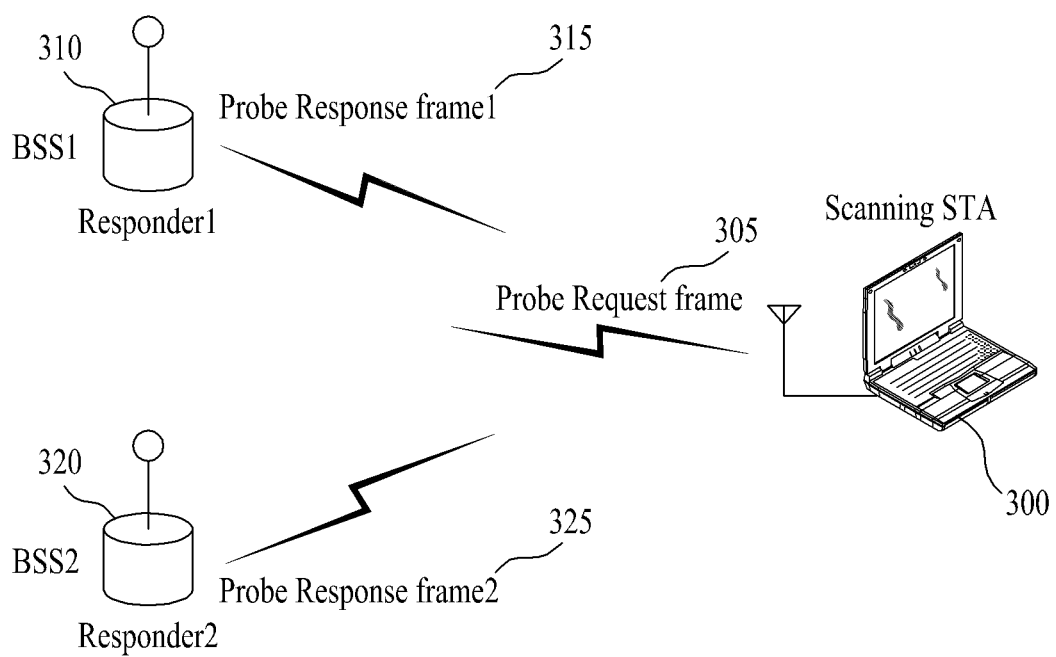
FIG. 3 illustrates a general view of active scanning.

FIG. 3 illustrates a general view of active scanning.

The STA performing scanning in the active scanning method shifts from one channel to another and transmits a probe request frame in order to search and determine a type of AP existing in the surrounding area of the corresponding STA, and, then, the STA waits for the respective response. As a response to the probe request frame, a responder transmits a probe response frame to the STA having transmitted the probe request frame. Herein, the responder corresponds to an STA having performed a final beacon frame transmission from a BSS of the channel, which is being scanned. In the infrastructure BSS, since the AP transmits the beacon frame, the AP corresponds to the responder, and, in the IBSS, since the STAs existing in the IBSS take turns for transmitting the beacon frame (or alternately transmit the beacon frame), the responder is not consistent.

Referring to FIG. 3, when a scanning STA (300) transmits a probe request frame (305), Responder 1 (310) and Responder 2 (320) of BSS1 having received the transmitted probe request frame respectively transmits a Probe Response Frame 1 (315) and a Probe Response Frame 2 (325) to the scanning STA (300). After receiving the probe response frame, the scanning STA (300) stores BSS associated information, which is included in the received probe response frame, and, then, shifts to another channel, so as to perform scanning in a next channel by using the same method.

Figure 4:
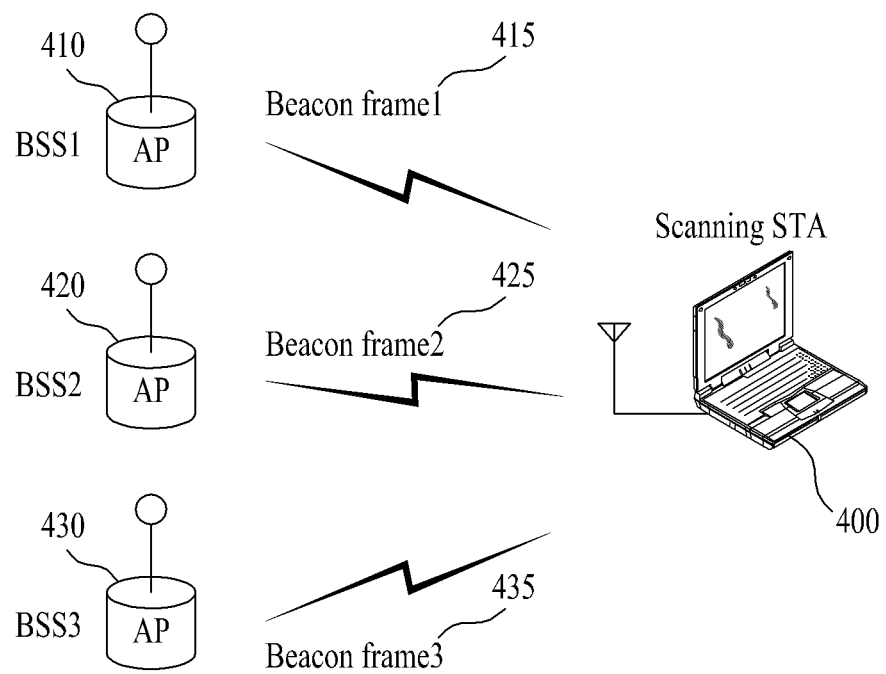
FIG. 4 illustrates a general view of passive scanning.

FIG. 4 illustrates a general view of passive scanning.

The STA performing scanning in the passive scanning method shifts from one channel to another and waits for a beacon frame. The beacon frame corresponds to one of management frames within IEEE 802.11, and, herein, the beacon frame notifies the existence (or presence) of a wireless network and uses the STA, which performs scanning, to find (or locate) a wireless network performs periodic transmission so that the STA can participate in the wireless network. In the infrastructure BBS, the AP performs the function of periodically transmitting the beacon frame.

When the STA performing scanning receives a beacon frame, the corresponding STA stores information on the BSS, which is included in the received beacon frame, and, then, the STA shifts to another channel and records beacon frame information in each channel.

In FIG. 4, when the scanning STA (400), which is performing channel scanning by using the passive scanning method in a specific channel, receives Beacon Frame 1 (415) being transmitted by AP1 (410) of BSS1, and receives Beacon Frame 2 (425) being transmitted by AP2 (420) of BSS2, and, when the scanning STA (400) fails to receive Beacon Frame 3 (435) being transmitted by AP3 (430) of BSS3, the scanning STA (400) stores that 2 BSSs (BSS1 and BSS2) have been discovered (or detected) in the measured channel and, then, shifts to another channel.

When comparing the active scanning method and the passive scanning method, the active scanning method is more advantageous in that delay and power consumption is smaller than the passive scanning method.

Hereinafter, an enablement process of an STA in order to allow the STA to be operated in a white space band will hereinafter be described in detail.

An unlicensed device operating in the white space band may be categorized as an Enabling STA and a Dependent STA. As an STA that can enable (or activate) the Dependent STA, the corresponding STA may transmit signals without receiving an enabling signal and may initiate the network.

The Enabling STA may provide geo-location information in the database (DB) and may acquire available channel information that is available for usage in the corresponding geo-location. The Enabling STA is not necessarily required to correspond to a WLAN STA, and any logical entity or network server that can provide services related to enablement may correspond to the Enabling STA.

As an STA that can transmit a signal only when an Enabling signal is received, the Dependent STA is controlled by the Enabling STA. The Dependent STA must be enabled by using the Enabling STA and cannot be enabled independently.

Figure 5:
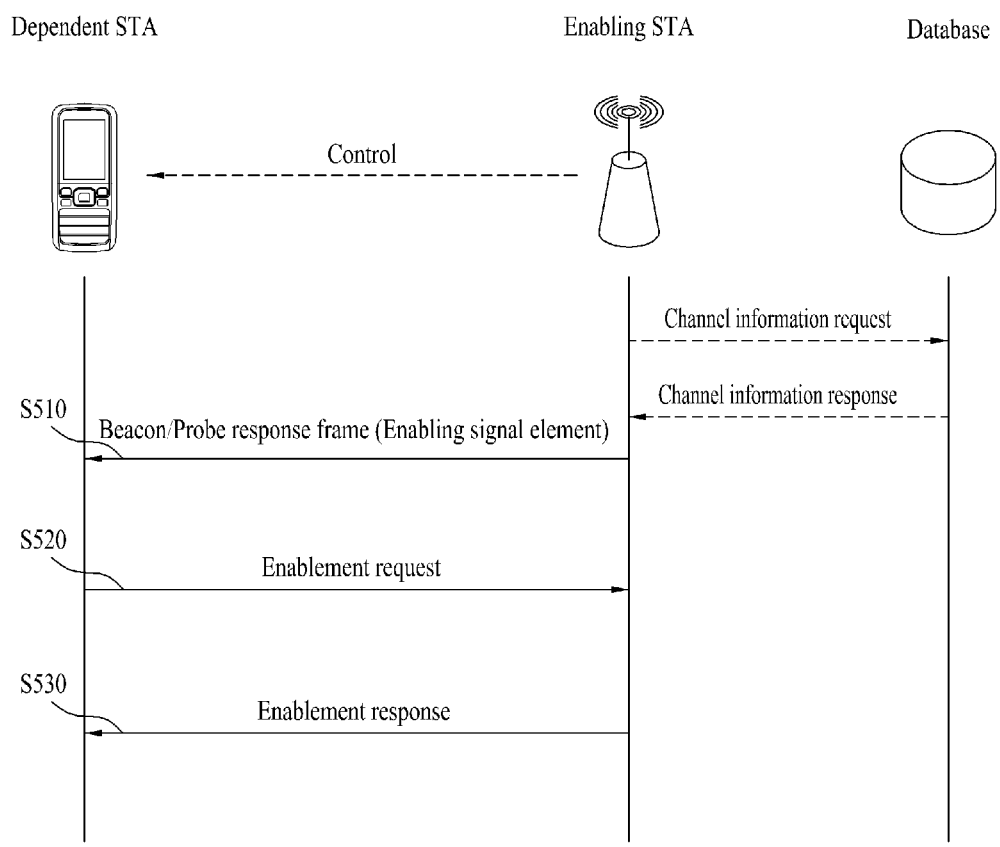
FIG. 5 illustrates an activation process of an STA.

FIG. 5 illustrates an exemplary activation process of an STA.

IEEE 802.11y corresponds to a standard that is developed for the operation of unlicensed devices in a 3.5 GHz band, and, herein, an Enablement process is described, and the enablement process is referred to as Dynamic STA Enablement (DSE). A process of having the Dependent STA be enabled (or activated) the Enabling STA may follow process that is similar to a Dynamic STA Enablement process of IEEE 802.11y. Actually, the enablement process being applied in the white space may not necessarily be identical to the DSE process, yet, essentially, the fact that a Dependent STA may transmit a signal to the corresponding band/channel only after receiving an enabling signal is identical to the DSE process.

As shown in FIG. 5, an Enabling STA may transmit a Beacon or Probe Response frame including an enabling signal to a Dependent STA (S510). Herein, a signal notifying that enablement can be performed is referred to as an enabling signal, and in the example of FIG. 5, a beacon or probe response frame including an enabling signal element corresponds to the enabling signal. After receiving and decoding the enabling signal, the Dependent STA transmits an Enablement Request Frame to the Enabling STA by using the channel having received the corresponding signal (S520), and the Dependent STA receives an Enablement Response Frame from the Enabling STA (S530).

Meanwhile, referring to the above-described TVWS in more detail, an unlicensed device that wishes to use the TVWS should provide a protection (or guard) function with respect to a licensed device (or incumbent user). Therefore, prior to initiating signal transmission from the TVWS, the unlicensed device must verify whether or not a licensed device (or incumbent user) is occupying the corresponding band.

In order to do so, the unlicensed device may verify whether or not the corresponding band is being used by a licensed device (or incumbent user) by performing spectrum sensing/carrier sensing. A spectrum sensing mechanism includes an Energy Detection method, a Feature Detection method, and so on. When an intensity level of a signal that is received from a specific channel is equal to or greater than a predetermined value, or when a DTV preamble is detected, the unlicensed device may determine that a licensed device (or incumbent user) is currently using the specific channel. Additionally, when it is determined that a channel directly neighboring the currently used channel is being used by a licensed device (or incumbent user), the unlicensed device is required to reduce its transmission power.

Additionally, the unlicensed device should acquire channel list information available to the unlicensed device in the corresponding region by accessing the database (DB) through the internet. The DB corresponds to a database that is configured to store information on licensed devices (or incumbent users), which are registered therein, and information on the channel usage, which changes dynamically in accordance with the geo-location and usage time of the corresponding licensed devices (or incumbent users).

In the description of the present document, a white space band includes the above-described TVWS, however, the white space band is not required to be limited only to this. In this document, the term white space band refers to a band wherein operation of licensed devices (or incumbent users) is given top-priority authorization, and wherein operation of unlicensed devices is authorized only when protection (or guard) respective to the licensed devices (or incumbent users) is ensured. Additionally, a White Space Device refers to a device that is being operated in a white space band. For example, a device according to an IEEE 802.11 system may also corresponds to an example of a white space device, and, in this case, the white space device may be referred to as an unlicensed device that is being operated by using an IEEE 802.11 MAC (Medium Access Control) later and a PHY (Physical) layer in the white space band. More specifically, a general AP and/or STA according to the 802.11 standard operating in the white space band may correspond to an example of the unlicensed device.

Hereinafter, in relation to the above-described contents, a frame structure that can efficiently perform carrier sensing will be proposed. In the following description, although a channel may signify the examples shown in IEEE 802.11ac and IEEE 802.11af PHY, which are described above in Table 1, the present invention will not be limited only to this, and the channel may also signify channels that are set up to be used in other (WLAN) wireless communication systems other than the wireless communication system. Furthermore, in the following description, the term terminal may be replaced by other terms, such as AP, STA, UE (User Equipment), MS (Mobile Station), MMS (Mobile Subscriber Station), SS (Subscriber Station), and so on.

Figure 6:
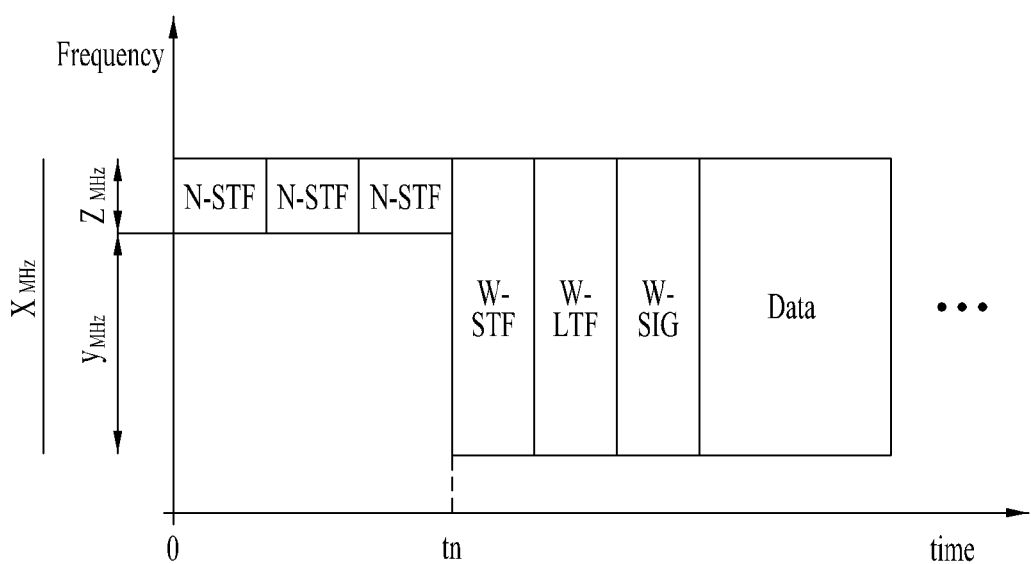
FIG. 6 illustrates a frame structure proposed in the present invention.

FIG. 6 illustrates a frame structure proposed in the present invention. Referring to FIG. 6, a frequency bandwidth of the exemplary channel corresponds to x MHz, and it will be apparent that FIG. 6 corresponds to a structure, wherein a specific signal is being transmitted to a starting portion (0~tn) of the channel along a time axis only at some of the frequency bands (z MHz) of the entire frequency bands of the corresponding channel. Herein, the specific signal may correspond to a signal that is being transmitted by a user equipment using the corresponding channel (e.g., a user equipment transmitting a signal from the corresponding channel) for the carrier sensing of other user equipments. Additionally, the specific channel for the carrier sensing may correspond to a signal including information on the frequency bandwidth of the channel. For example, in the example shown in FIG. 6, the signal for the carrier sensing may include information that can indicate that the bandwidth of the corresponding channel is x MHz.

Additionally, as shown in the example of FIG. 6, the specific signal for the carrier sensing may include an N-STF (Narrowband Short Training Field), an N-LTF (Narrowband Long Training Field), and an N-SIG (Narrowband Signal). The N-STF may correspond to a training field for Automatic gain control convergence, timing acquisition, and coarse frequency acquisition for common sensing band. The N-LTF may correspond to a training field for estimating a channel between each spatial mapper input and a reception chain for a common sensing band. The N-SIG may include information on a broadband body (which corresponds to a channel frequency band shown in FIG. 6) (e.g., frequency bandwidth, length, rate, address, and so on). The N-SIG may perform a function of notifying information indicating from which channel and at which length and rate an actual frame, which is transmitted after the N-SIG, is to be transmitted through information, such as the above-described bandwidth, length, rate, and so on. Among the diverse information that may be included in the N-SIG, the frequency bandwidth represents the bandwidth through which a W-STF, a W-LTF, a W-SIG, and DATA are being transmitted, i.e., the bandwidth of the corresponding channel, and the frequency bandwidth is used for detecting the W-STF, the W-LTF, and the W-SIG Address information performs a function of notifying a transmitter/receiver (or recipient) of the corresponding frame, and, if the corresponding frame itself is the receiver (or recipient) the corresponding frame may use information, such as bandwidth, length, rate, and so on, so as to be capable of receiving an actual frame that is subsequently transmitted. Additionally, if the corresponding frame itself is not the receiver (or recipient), a NAV is set up by using length and rate information. (virtual carrier sensing) The above-described specific signal for carrier sensing may be configured of at least one or more OFDM symbols. And, a detailed configuration of the above-described specific signal for carrier sensing, i.e., the N-STF, N-LTF, and N-SIG are merely exemplary, and, as long as at least part of the above-described information is included, the corresponding frame may be given a different name, configuration, and so on, based upon the type/configuration of the wireless communication system to which the user equipment/channel corresponds.

Moreover, as shown in the drawing, in a time section (or time interval) (0~tn), wherein the signal for carrier sensing is being transmitted, signals are not transmitted through the remaining bandwidths (y MHz) of the channel.

In other words, in the proposed frame structure, before performing a signal transmission that uses all bandwidths of the corresponding channel, a signal for performing carrier sensing including diverse information related to the bandwidth of the corresponding channel may be transmitted through some of the bandwidths of the overall bandwidths of the corresponding channel. In the above-described frame structure, an aspect of transmitting signals and an aspect of receiving signals will be briefly described.

In the aspect of transmitting signals, among the frequency bandwidths of the frequency used by the user equipment, the user equipment may transmit a signal for performing carrier sensing on other user equipment during a predetermined time section in some of the frequency bandwidths. Herein, the signal for performing carrier sensing may include information on the frequency bandwidths of the corresponding channel. Following the transmission of the signal for performing carrier sensing, the user equipment may transmit control information (e.g., in the exemplary case shown in FIG. 6, STF, LTF, SIG) and data (DATA). In the aspect of receiving signals, the user equipment may perform carrier sensing in order to verify whether or not the usage of multiple channels corresponding to a specific frequency band of the user equipment itself is available within the corresponding frequency band. In this case, the user equipment not only performs carrier sensing in accordance with the bandwidth of all channels set up in the wireless communication system in order to verify whether or not the multiple channels are available for usage, but the user equipment may also perform carrier sensing that is only coherent to a frequency bandwidth, through which the above-described signal for the above-described carrier sensing.

Meanwhile, in the frame structure proposed in the present invention, the frequency bandwidth through which the signal for performing carrier sensing is being transmitted, may correspond to a frequency band that is set up in a wireless communication system being operated by a user equipment, wherein the frequency band has multiple channels each having a different bandwidth that overlap one another. In this case, the frequency bandwidth through which the signal for the carrier sensing is transmitted may correspond to a frequency bandwidth signifying a common sensing band. Details on this content will hereinafter be described in more detail in the description of the exemplary embodiments having the frame structure of the present invention applied therein.

Hereinafter, detailed exemplary embodiments having the frame structure of the present invention applied therein will be described in detail. In the following exemplary embodiments, an exemplary channelization structure of the TVWS and a frame structure for carrier sensing in the corresponding channelization structure will be described, yet the present invention will not necessarily be limited only to this, and, therefore, it will be apparent that the frame structure of the present invention may be generally applied to a wireless communication system, wherein multiple channels each having a different bandwidth are set up in a specific frequency band, and wherein a user equipment may use the corresponding channel through carrier sensing.

Embodiment 1

Figure 7:
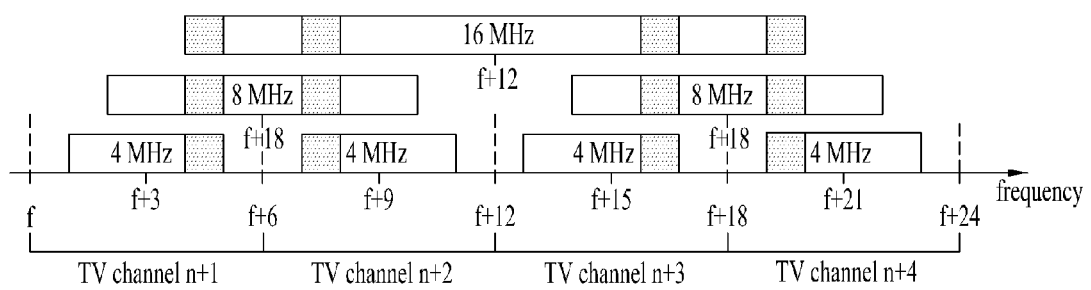
FIG. 7 to FIG. 14 respectively illustrate each exemplary embodiment of the present invention.

FIG. 7 illustrates an exemplary channelization structure that may correspond to a prerequisite of Exemplary Embodiment 1. In FIG. 7, a horizontal axis refers to a frequency axis, and each rectangular box indicates a WLAN channel. Number marked in each rectangular box corresponds to a bandwidth of the respective channel, and a carrier frequency (center frequency) of the respective channel is marked at the center of each box. And, a shaded area corresponds to the common sensing band. FIG. 7 shows a WLAN channelization in 4 consecutive TV channels, and in the overall TV WS bandwidth the details shown in FIG. 7 are repeated for each set of 4 TV channels.

Moreover, referring to FIG. 7, in case of a 4 MHz channel, for a case when the WLAN user equipment can use only 1 TV channel, a guard band of 1 MHz is set up on each side of the TV channel, and the 4 MHz channel is located at the center of the TV channel. This is to meet with a spectrum mask of a Regulation. When the WLAN user equipment is capable of using 2 consecutive TV channels, an 8 MHz channel may be used, or 2 of the above-described 4 MHz channels may be used. Among a total set of 12 MHz, the 8 MHz channel has a guard band of 2 MHz located on each side and is located at the center of two consecutive channels. In order to allow the WLAN user equipment to use a 16 MHz channel, at least 3 consecutive 6 MHz TV channels are required. However, in this case, guard bands of 1 MHz can only be located on each side. Therefore, it is assumed in FIG. 7 that, in this case, it will be difficult to realize an RF that can satisfy the spectrum mask. Therefore, in the example shown in FIG. 7, the WLAN user equipment can use the 16 MHz channel only in a case when 4 consecutive TV channels are provided. Evidently, instead of the 16 MHz channel, the WLAN user equipment may also use 2 or more 4 MHz channels or 8 MHz channels. Among a total set of 24 MHz (6 MHz*4 TV channels), the 16 MHz channel has a guard band of 4 MHz located on each side, and the 16 MHz channel is located at the center. Although it is not shown in FIG. 7, a 32 MHz channel may also be defined by similarly using the above-described method. Among a total set of 6 consecutive TV channels, a guard band of 2 MHz may be located on each side, and the 32 MHz channel may be located at the center. The 32 MHz channel may be repeated for each set of 6 TV channels.

The channelization shown in FIG. 7 is advantageous in that an excellent performance may be yielded even in an environment including 1 or 2 consecutive TV channels. This is because, if 4 MHz is not located at the center of the TV channel, it will be difficult to satisfy the spectrum mask, and, therefore, the WLAN user equipment may not be capable of using the channel, or an expensive RF chip may be required to be used. In urban regions, there are only a few TV WS that can be used by the WLAN user equipments, and since most of them are not consecutive, the channelization according to the present invention is very effective in urban regions. Conversely, in the channelization shown in FIG. 7, since the 8 MHz and 16 MHz channels do not include the 4 MHz channel, the carrier sensing method of 802.11ac is not operated. Even if the 802.11ac transmits a frame through 40 MHz, 80 MHz, and 160 MHz channels, a PHY header part is transmitted by being repeated transmitted along the frequency axis in a same structure of 20 MHz units. The user equipment is configured to be aware of the fact that a frame is transmitted from 40 MHz, 80 MHz, and 160 MHz channels through the PHY header even by receiving the 20 MHz channel. However, this is possible because the 802.11ac channels are configured to perfectly overlap one another (wherein the 40 Hz channel is configured of 2 20 Hz channels, the 80 Hz channel is configured of 2 40 Hz channels, and 160 Hz channel is configured of 2 80 Hz channels), and in a non-continuous (or non-consecutive) channel structure, as shown in FIG. 7, such application cannot be made.

Figure 8:
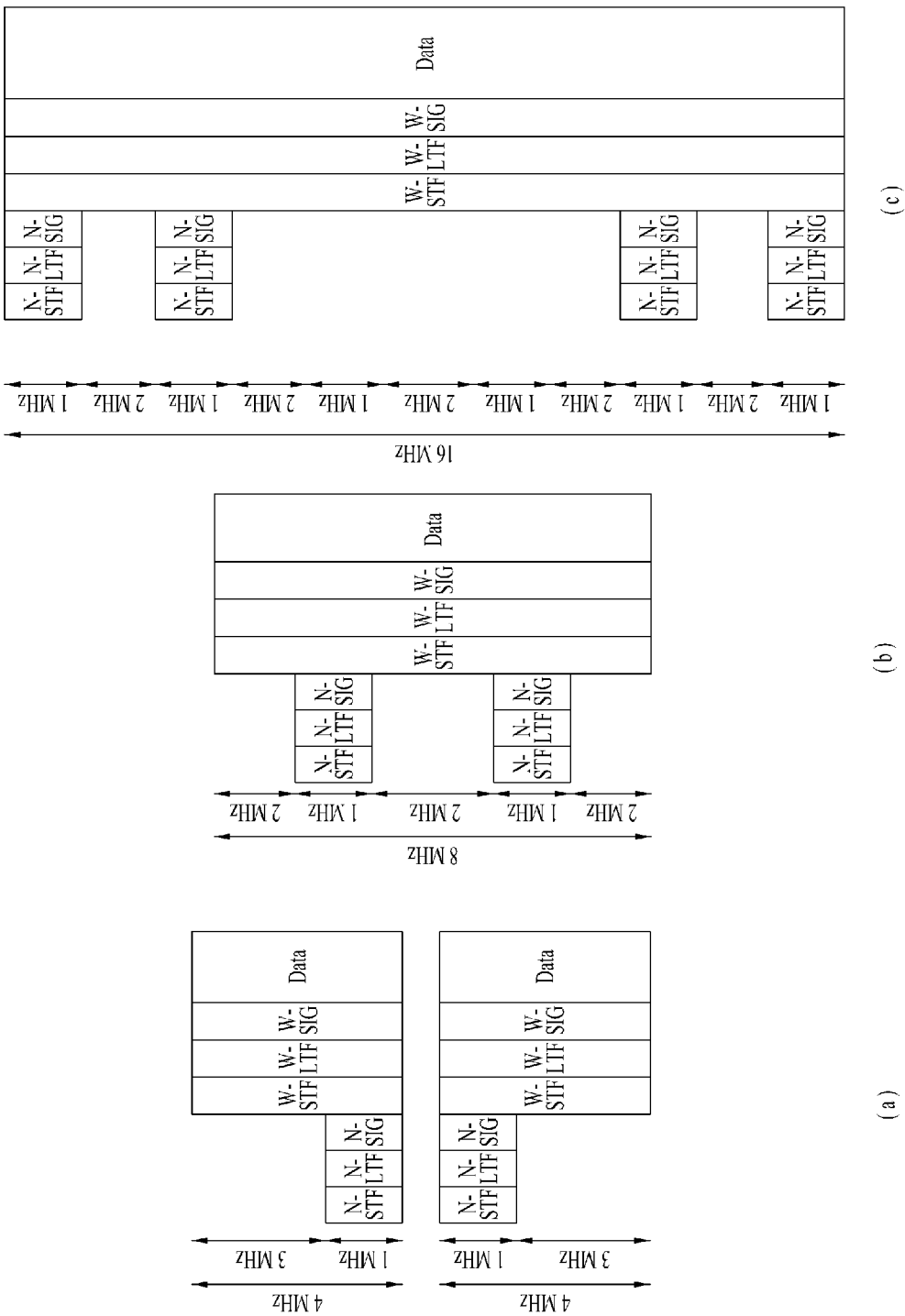

In the channelization shown in FIG. 7, the process of performing carrier sensing on all channel bandwidths respective to each of 4, 8, and 16 MHz channels may cause an overhead to the user equipment, however, this problem may be resolved by setting up a specific frequency band, which is commonly used by each channel, as the common sensing band, and by applying the frame structure according to the present invention, which is configured as described above. More specifically, a frequency band corresponding to the shaded area, wherein the 4, 8, and 16 MHz channels overlap one another, may be set up as the common sensing band. And, a header to which the signal for the carrier sensing is transmitted, as shown in FIG. 8, may be transmitted from the common sensing band. When a signal for the carrier sensing is transmitted from the common sensing band, the user equipment performing carrier sensing measures the size of an energy level of the receive signal and may, then, determine the presence or absence of a signal. A reference value of the energy level may be determined based upon an overall channel bandwidth contrast ratio of the overlapped portion, transmission power, and so on.

FIG. 8 illustrates a frame having the same structure as the frame described above with reference to FIG. 6 in each of (a) 4 MHz channel, (b) 8 MHz channel, and (c) 16 MHz channel, and detailed description of the same will be replaced by the description of FIG. 6.

Embodiment 2

In the channelization structure of FIG. 7, in case of the 4 MHz channel, since the position of the common sensing band can be located at any one of the right side or the right side of the channel (based upon a lower frequency), the user equipment is required to be capable of differentiating such positioning.

Figure 9:
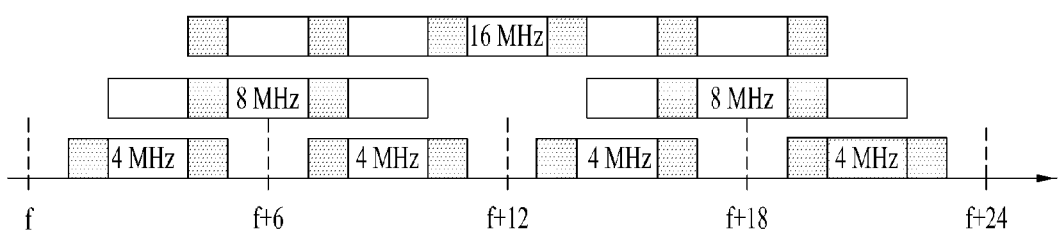
Figure 10:
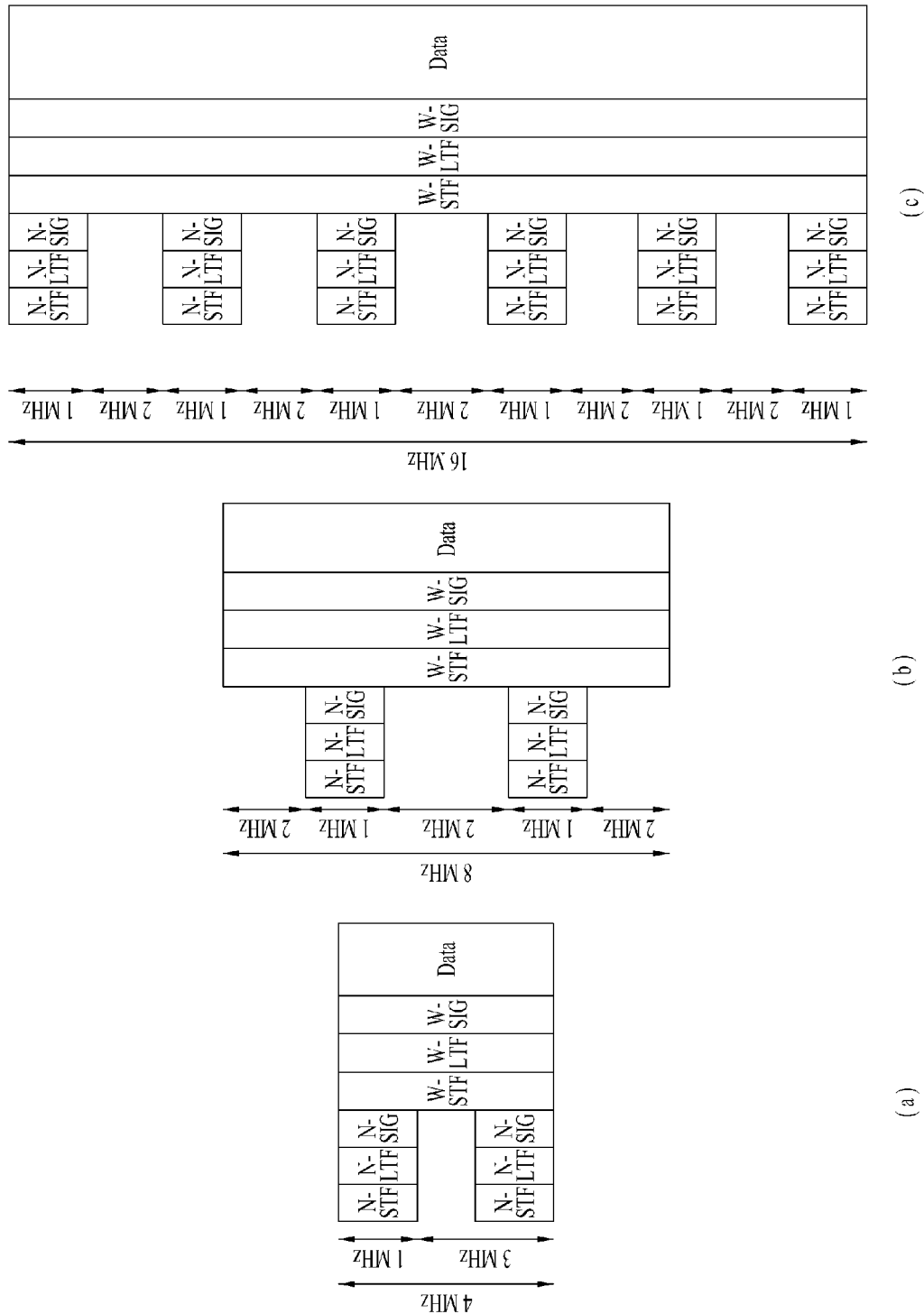

If the channelization is corrected (or amended) to allow the common sensing band to always be located at each end of the 4 MHz channel regardless of the position of the 4 MHz channel, so that the user equipment is no longer required to differentiate the position of the channel, the structure may be configured a shown in FIG. 9. In case of the channelization structure shown in FIG. 9, if the frame structure proposed in the present invention is applied to channels having bandwidths of 4 MHz, 8 MHz, and 16 MHz, the structure may be configured as shown in (a), (b), and (c) of FIG. 10.

Embodiment 3

Figure 11:
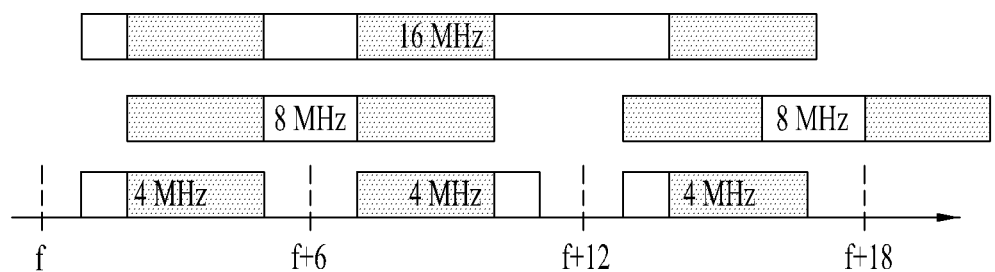
Figure 12:
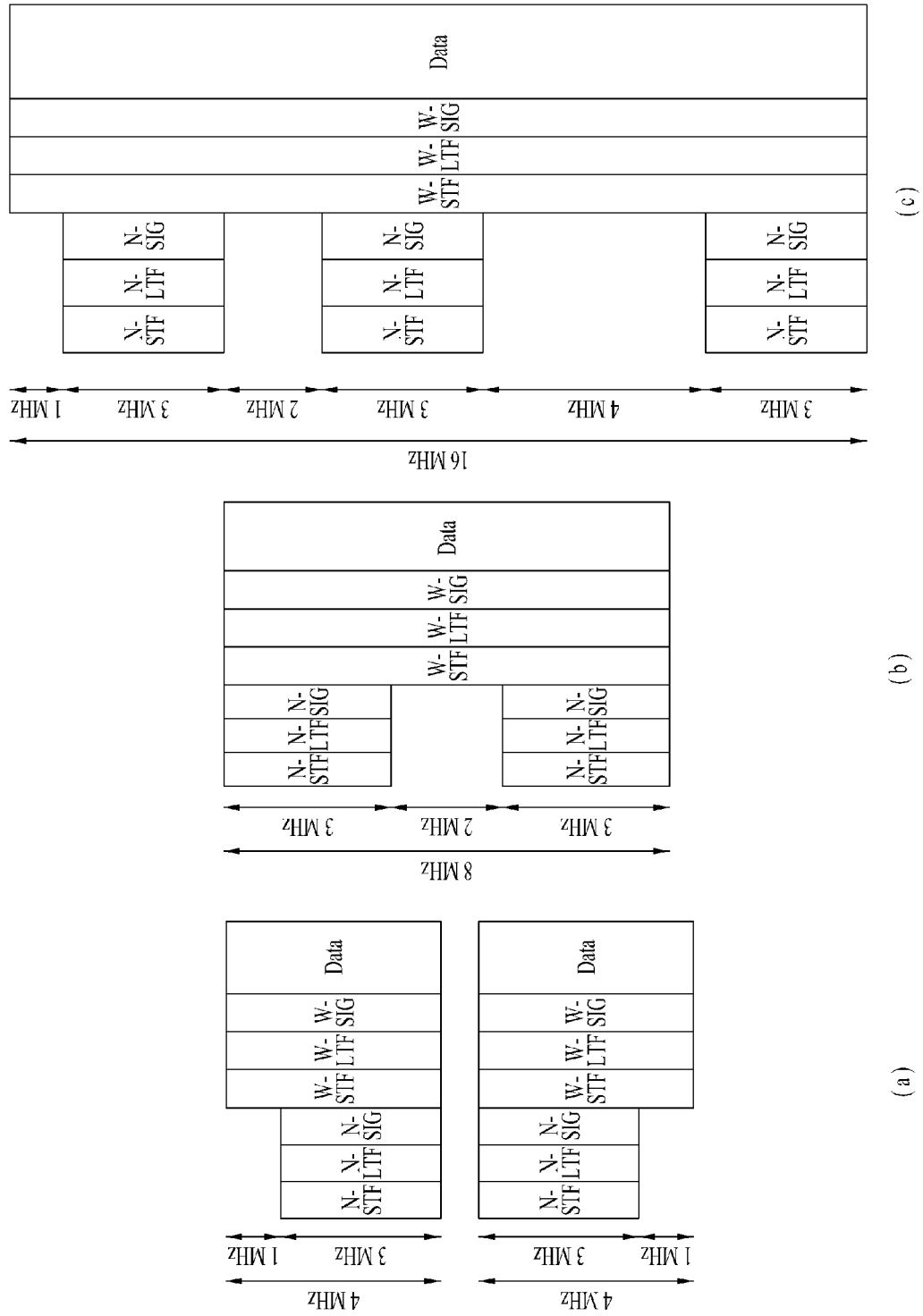

FIG. 11 illustrates an exemplary channelization when it is assumed that the WLAN user equipment can use a 16 MHz channel while positioning a guard band of 1 MHz at each end of 3 consecutive TV channels. This is a structure that can be configured when the performance of the RF chip is sufficiently excellent. In the channelization structure shown in FIG. 11, the common sensing band may correspond to a maximum of 3 MHz. Additionally, it will be evident that the common sensing band can be set to 1 MHz or 2 MHz for symmetry in the configuration. (a), (b), and (c) of FIG. 12 illustrate a frame structure, wherein the proposition of the present invention is applied to the channelization structure shown in FIG. 11.

Embodiment 4

Figure 13:
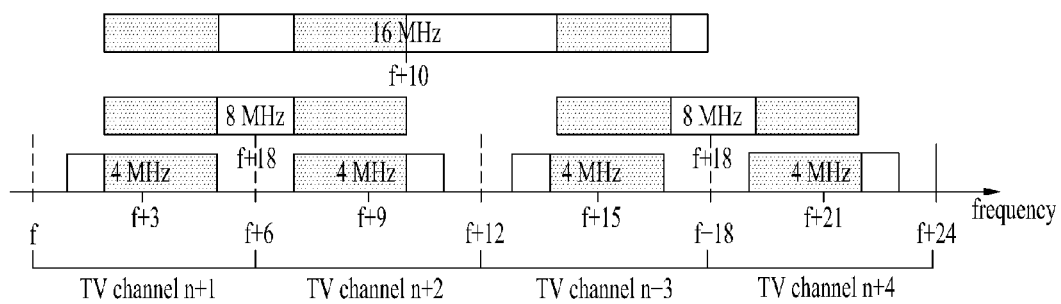
Figure 14:
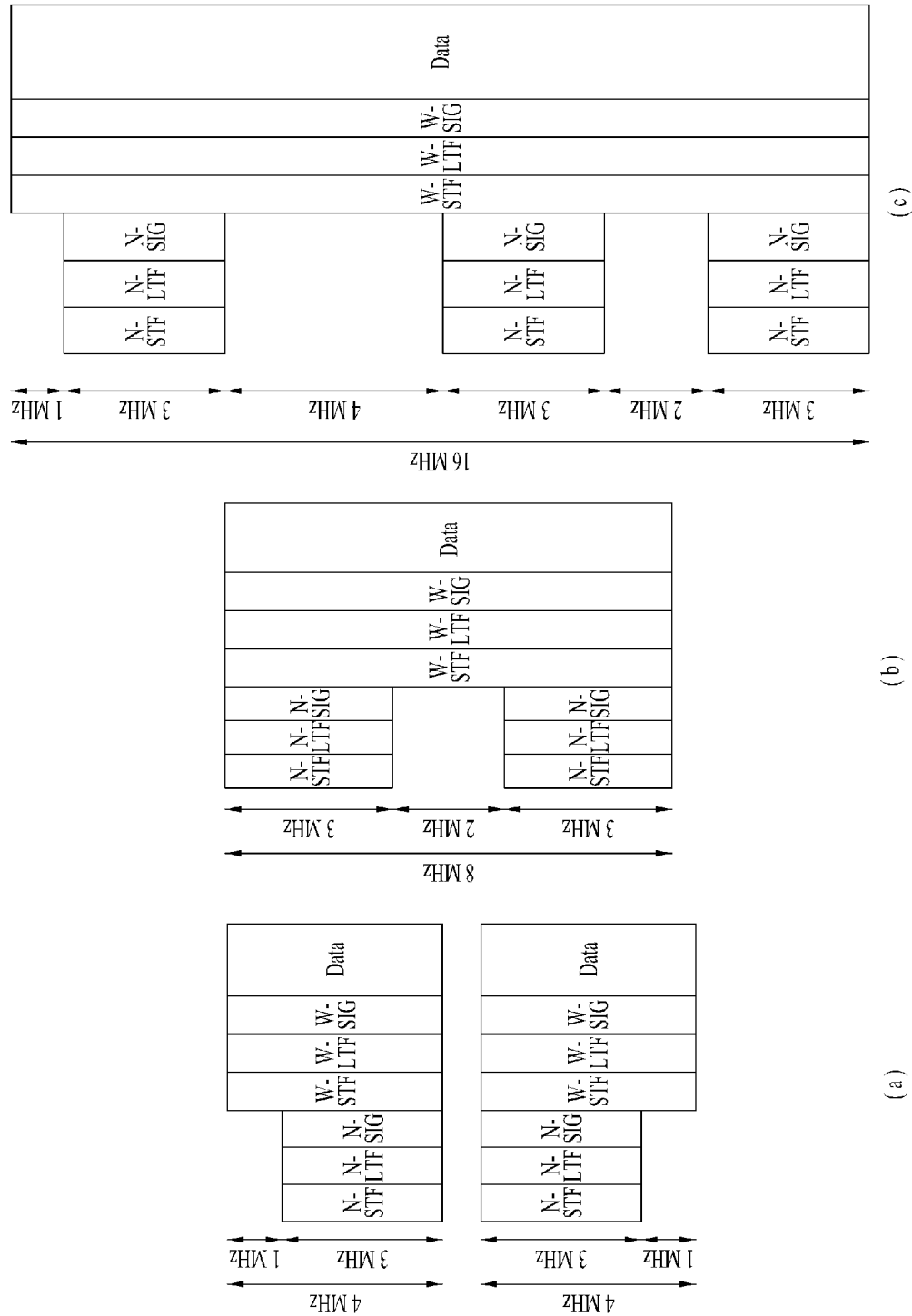

Subsequently, the channelization structure may be configured to have the structure shown in FIG. 13, and, in this case, the frame structure of each channel may be configured as shown in FIGS. 14(*a*), (*b*), and (*c*). Detailed description of the same will be replaced by the detailed description provided above.

Meanwhile, in description provided above, the user equipment performing carrier sensing may be capable of determining whether or not a channel is available for usage, when the user equipment is informed of the information on the bandwidth of the corresponding channel through the common sensing band. Herein, a prerequisite in this case will be that the user equipment performing carrier sensing is required to be informed in advance of information on the position in which the corresponding channel is located within the frequency band. For this, a beacon frame may be configured to include information on the positions in which each channel is located within the frequency band. More specifically, information on the positions in which each channel is located within the frequency band may be configured as a Channel information field, and this information may be included in a beacon frame, which is shown in FIG. 15. In FIG. 15, each field is defined in the 802.11 standard, and, therefore, detailed description of the same will be omitted.

A method for configuring a channel information field may include 4 different methods as described below. Such methods may all correspond to a method for indicating a specific channel, and, herein, only on method may be used, or two or more methods may be used in combination.

i) Configuration Using Channel Numbers

When WLAN channels of the TVWS each has its unit channel number, and when the user equipment is informed of this, channels in which a WLAN network is being operated may be notified to the user equipment by notifying the user equipment of the channel number. However, in this case, when a channel number that has already been designated once is changed, it will be difficult for the user equipment to recognize such change, and the user equipment may be burdened to be informed of information on all channel numbers for each country.

ii) Configuration Using Center Frequency and Bandwidth

This corresponds to a method of notifying (or information) a Center frequency and bandwidth of an operating channel. Although there is a relatively large amount of required information, the user equipment is not required to be informed of all channel numbers, and the user equipment may accurately (or correctly) shift the operating channel.

iii) Configuration Using Lowest Frequency and Highest Frequency iv) Configuration using Center frequency offset and Scaling factor—This corresponds to a method indicating how far away a center frequency of the operating channel is located based upon the current channel, how many times the bandwidth is higher (or lower), and so on. If the operating channel is higher than the current channel, the offset is equal to a positive number, and, if the operating channel is lower than the current channel, the offset is equal to a negative number. If the bandwidth of the operating channel is greater than the current channel, a scaling factor is greater by 1, and, if the bandwidth of the operating channel is smaller than the current channel, a scaling factor is smaller by 1.

A detailed exemplary application of the methods for configuring the above-described channel information field is as shown below in Table 2. Table 2 shows channel information field values of a beacon frame that is to be transmitted by an AP from 4 MHz No. 1 and No. 2, wherein the AP previously operates in 8 MHz Channel No. 5.

TABLE 2

| Case i) | Channel information in beacon frame on ch.1: Channel number = 5Channel information in beacon frame on ch.2: Channel number = 5 |
| Case ii) | Channel information in beacon frame on ch.1: Center frequency = f + 6, Bandwidth = 8Channel information in beacon frame on ch.2: Center frequency = f + 6, Bandwidth = 8 |

TABLE 2-continued

| Case iii) | Channel information in beacon frame on ch.1: Low frequency = f + 2, High frequency = f + 10 Channel information in beacon frame on ch.2: Low frequency = f + 2, High frequency = f + 10 |
| Case iv) | Channel information in beacon frame on ch.1: Center frequency offset = +3, Scaling factor = 2 Channel information in beacon frame on ch.2: Center frequency offset = −3, Scaling factor = 2 |

Referring to Table 2, the number of required bits is the smallest when using i), however, this case is disadvantageous in that a larger amount of information should be additionally known. Conversely, in methods ii)-iv), a larger number of bits is required, however, operation may be carried out without any problem even if the user equipment is not aware of the channel number, or if the channel number has changed.

Meanwhile, in combination with the above-described contents of the present invention, or independently, a specific signal is placed over a guard tone and used accordingly. The guard tone is generally used in order to avoid interference at each end portion, and, by using such guard tone, carrier sensing may be performed more easily.

Referring back to the channelization of FIG. 9, examples of the 4 MHz channel located at the left side end and the 16 MHz channel will be described in detail. In this case, the right side of the 4 MHz channel and the left side of the 16 MHz channel overlap with one another by 1 MHz. However, since a guard tone actually exists, the overlapping portion of the data/pilot tone is merely 0.2 MHz. If transmission is performed by both channels while maintaining the guard tone, both channels may carrier sense the 0.2 MHz signal. In this situation, since the channels are different from one another, an energy detection method is used. However, since only the 0.2 MHz signal is detected by both channels, detection is very difficult to be performed due to the low reception power. Eventually, due to the failure in the sensing process, transmission is performed simultaneously, thereby causing interference between one another. However, if a specific signal is transmitted over the guard tone, since both channels may fully receive and sense the 1 MHz signal, detection may be more easily performed.

In some case, the guard tone may only be used some channels. For example, since it is difficult for the 4 MHz channel to satisfy the spectrum mask, the 4 MHz channel does not use the guard period. And, in the 8 MHz and 16 MHz channels, which are relatively capable of satisfying the spectrum mask, a signal may be used over the guard tone. Alternatively, another signal may be used over the guard tone only in the 16 MHz channel.

The signal that is to be carried over the guard tone may be diversely applied as described below.

i) Decrease in PAPR: A specific signal may be carried over a guard tone in order to reduce the PAPR. First of all, a data/pilot tone is mapped by using the conventional method, and, then, after recognizing a current signal pattern, a signal that can reduce the PAPR is added to the guard tone.

ii) Dummy signal: This literally corresponds to an insignificant signal. This is advantageous in that realization in this case may be performed easily.

iii) Data: Data corresponding to the center portion of the signal are copied (or duplicated) and carried over the guard tone. In this case, the reliability of the data transmission may be increased. Alternatively, as in other carriers, the data may be used as a data tone. In this case, since the number of data tones is increased without carrying out the copy (or duplication) process, a throughout may be enhanced.

iv) Pilot: The signal may be used as a Pilot and then used for performing channel estimation.

Figure 16:
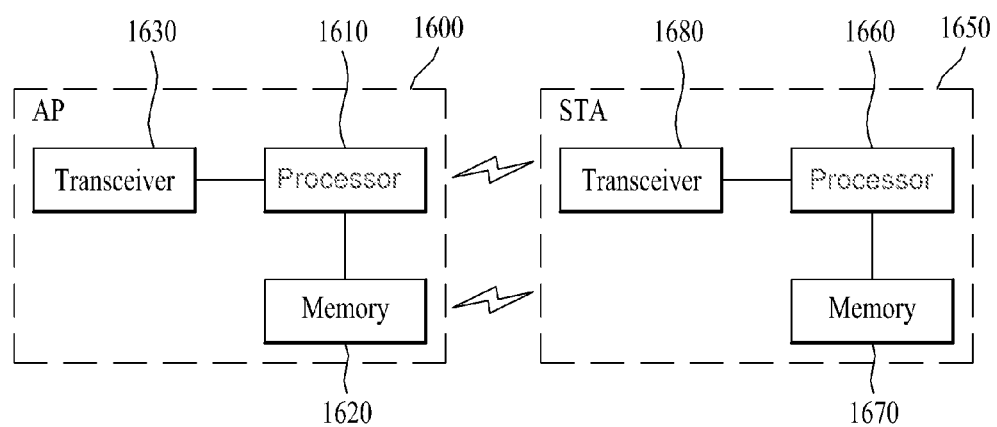
FIG. 16 illustrates a block view showing an exemplary structure of a wireless device according to an exemplary embodiment of the present invention.

FIG. 16 illustrates a block view showing an exemplary structure of a wireless device according to an exemplary embodiment of the present invention.

An AP (1600) may include a processor (1610), a memory (1620), and a transceiver (1630). An STA (1650) may include a processor (1660), a memory (1670), and a transceiver (1680). The transceiver (1630 and 1660) may transmit/receive a radio signal, and, for example, the transceiver (1630 and 1660) may realize a physical layer according to the IEEE 802 system. The processor (1610 and 1660) may be connected to the transceiver (1630 and 1660), thereby being capable of realizing a physical layer and/or a MAC layer according to the IEEE 802 system. The processor (1610) may be operated to be capable of processing the above-described diverse exemplary embodiments of the present invention.

Detailed configuration of the above-described AP device and STA device may be realized, so that details described above in accordance with the diverse exemplary embodiments of the present invention can be independently applied, so that can 2 or more exemplary embodiments can be simultaneously applied, and detailed description of the overlapping contents will be omitted for clarity.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although a wide range of the above-described exemplary embodiments of the present invention are described based upon an example being applied to the IEEE 802.11 system, the present invention may also be applied to other variety of wireless communication systems by using the same method.

What is claimed is:

1. A method of transmitting a signal by a first user equipment in a wireless communication system, the method comprising:
   transmitting a signal for carrier sensing second user equipments during a predetermined period of time in one or more frequency bands among multiple frequency bands of a channel used by the first user equipment,
   wherein the signal for carrier sensing includes information on a frequency bandwidth of the channel, and
   wherein the signal for carrier sensing comprises a narrowband-short training field (N-STF), a narrowband-long training field (N-LTF), and a narrowband-signal (N-SIG).

2. The method of claim 1, wherein the signal for carrier sensing is transmitted before the first user equipment transmits a signal from a frequency bandwidth of the channel.

3. The method of claim 1, wherein the one or more frequency bands correspond to a frequency band, where multiple channels each having a different bandwidth overlap one another.

4. The method of claim 1, wherein signal transmission is not carried out during the predetermined period of time in remaining frequency bands excluding the one or more frequency bands.

5. The method of claim 1, wherein information indicating a position in which a frequency bandwidth of the channel is located within the overall frequency bands of the wireless communication system is included in a beacon frame.

6. A method of receiving a signal by a user equipment in a wireless communication system, the method comprising:
   receiving a signal for carrier sensing during a predetermined period of time in one or more frequency bands of a channel configured in the wireless communication system,
   wherein the signal for carrier sensing includes information on a frequency bandwidth of the channel, and
   wherein the signal for carrier sensing comprises a narrowband-short training field (N-STF), a narrowband-long training field (N-LTF), and a narrowband-signal (N-SIG).

7. The method of claim 6, wherein the signal for carrier sensing is transmitted before a signal is transmitted from a frequency bandwidth of the channel.

8. The method of claim 6, wherein the one or more frequency bands correspond to a frequency band, where multiple channels including the channel each having a different bandwidth overlap one another, the different bandwidths being set up in the wireless communication system.

9. The method of claim 6, wherein signal transmission is not carried out during the predetermined period of time in remaining frequency bands excluding the one or more frequency bands.

10. The method of claim 6, wherein information indicating a position in which a frequency bandwidth of the channel is located within the overall frequency bands of the wireless communication system is received from a beacon frame.

11. A user equipment transmitting a signal in a wireless communication system, the user equipment comprising:
a transceiver; and
a processor configured to control the transceiver to:
transmit a signal for carrier sensing other user equipments during a predetermined period of time in one or more frequency bands among multiple frequency bands of a channel used by the user equipment,
wherein the signal for carrier sensing includes information on a frequency bandwidth of the channel, and
wherein the signal for carrier sensing comprises a narrowband-short training field (N-STF), a narrowband-long training field (N-LTF), and a narrowband-signal (N-SIG).

12. A user equipment receiving a signal in a wireless communication system, the user equipment comprising:
a transceiver; and
a processor configured to control the transceiver to:
receive a signal for carrier sensing during a predetermined period of time in one or more frequency bands configured in the wireless communication system,
wherein the signal for carrier sensing includes information on a frequency bandwidth of the channel, and
wherein the signal for carrier sensing comprises a narrowband-short training field (N-STF), a narrowband-long training field (N-LTF), and a narrowband-signal (N-SIG).

* * * * *